United States Patent
Liu et al.

(10) Patent No.: US 9,500,331 B2
(45) Date of Patent: Nov. 22, 2016

(54) LIGHT COMPENSATOR, SHADING TAPE, BACKLIGHT MODULE AND DISPLAY DEVICE

(71) Applicants: BOE TECHNOLOGY GROUP CO., LTD., Beijing (CN); HEFEI BOE DISPLAY LIGHT CO., LTD., Hefei, Anhui (CN)

(72) Inventors: Gang Liu, Beijing (CN); Shuyong He, Beijing (CN); Zungan Ling, Beijing (CN)

(73) Assignees: BOE TECHNOLOGY GROUP CO., LTD., Beijing (CN); HEFEI BOE DISPLAY LIGHT TECHNOLOGY CO., LTD., Hefei, Anhui (CN)

( * ) Notice: Subject to any disclaimer, the term of this patent is extended or adjusted under 35 U.S.C. 154(b) by 187 days.

(21) Appl. No.: 14/598,864

(22) Filed: Jan. 16, 2015

(65) Prior Publication Data
US 2015/0323836 A1 Nov. 12, 2015

(30) Foreign Application Priority Data
May 12, 2014 (CN) .......................... 2014 1 0198668

(51) Int. Cl.
*F21S 8/00* (2006.01)
*G02F 1/1335* (2006.01)
(Continued)

(52) U.S. Cl.
CPC .. *F21S 8/00* (2013.01); *F21V 7/22* (2013.01); *F21V 13/10* (2013.01); *G02B 6/0011* (2013.01);
(Continued)

(58) Field of Classification Search
CPC .... F21V 7/04; F21V 13/02; G02F 1/133605; G02F 1/133611; G02F 1/29; G02F 1/292; G02B 6/0011; F21Y 2103/10; F21Y 2105/10
See application file for complete search history.

(56) References Cited

U.S. PATENT DOCUMENTS

2006/0056200 A1* 3/2006 Yamashita ........... G02B 6/0013
362/620
2006/0269189 A1* 11/2006 Seo ...................... G02B 6/0028
385/39
(Continued)

FOREIGN PATENT DOCUMENTS

CN 102980102 A 3/2013
CN 103017036 A 4/2013
(Continued)

OTHER PUBLICATIONS

Office Action dated Feb. 12, 2015 issued in corresponding Chinese Application No. 201410198668.1 along with the English translation thereof.
(Continued)

*Primary Examiner* — Hargobind S Sawhney
(74) *Attorney, Agent, or Firm* — Nath, Goldberg & Meyer; Joshua B. Goldberg

(57) ABSTRACT

The present invention provides a light compensator, a shading tape, a backlight module and a display device. The light compensator comprises a first surface on which at least one recess is provided, wherein, when the light compensator is arranged above an edge of an optical element, the first surface faces a light-exiting surface of the optical element, and a surface of the recess is capable of converging light irradiating thereon and reflecting the light toward an area with low luminance on the light-exiting surface of the optical element. The above light compensator can perform light compensation on areas with low luminance on the light-exiting surface of the optical element, enhance the luminance of the areas with low luminance on the light-exiting surface of the optical element, and achieve luminance uniformity of respective areas on the light-exiting surface of the optical element.

20 Claims, 4 Drawing Sheets

(51) Int. Cl.
*F21V 7/22* (2006.01)
*F21V 13/10* (2006.01)
*F21V 8/00* (2006.01)

(52) U.S. Cl.
CPC ... *G02F 1/133605* (2013.01); *G02F 1/133608* (2013.01); *G02F 1/133611* (2013.01); *G02F 1/133615* (2013.01)

(56) References Cited

U.S. PATENT DOCUMENTS

2006/0274551 A1* 12/2006 Takada ................. G02B 6/0055 362/611
2008/0175022 A1* 7/2008 Sugiura ................ G02B 6/0091 362/609
2014/0160732 A1* 6/2014 He ....................... G02B 6/0031 362/97.1

FOREIGN PATENT DOCUMENTS

| CN | 103292207 A | 9/2013 |
| KR | 101298606 B1 | 8/2013 |

OTHER PUBLICATIONS

2nd Office Action issued in Chinese application No. 201410198668.1 dated Aug. 5, 2015.

* cited by examiner

LIGHT COMPENSATOR, SHADING TAPE, BACKLIGHT MODULE AND DISPLAY DEVICE

FIELD OF THE INVENTION

The present invention relates to the field of liquid crystal display technology, and particularly to a light compensator, a shading tape including the light compensator, a backlight module including the shading tape, and a display device including the light compensator, the shading tape or the backlight module.

BACKGROUND OF THE INVENTION

Liquid crystal display, due to its advantages of low radiation, less power consumption, thinness, light weight and the like, has been applied more and more widely. Currently, liquid crystal display technology has become a mainstream display technology.

In a liquid crystal display, since liquid crystals do not emit light themselves, but regulate light instead, it is necessary to provide a liquid crystal display panel with a backlight module so that images can be displayed on the screen of the liquid crystal display. A light guide plate is one of the key components of the backlight module, and is used for transforming light emitted from multiple point light sources or line light sources into a surface light source and then casting the transformed light onto the display panel. In the above backlight module, a ratio of a distance between the light sources and an active area of the display panel to a pitch between adjacent light sources, that is, an A/P ratio, is a key parameter that affects luminance uniformity in respective areas of the light guide plate. When the A/P ratio is small, that is, when the distance between the light sources and the active area of the display panel is small and the pitch between adjacent light sources is large, a hotspot phenomenon that some areas on the light guide plate are significantly darker than the other areas on the light guide plate and dark areas are formed may occur.

In order to alleviate the above hotspot phenomenon due to small A/P ratio, generally, a predetermined dot-pattern micro-structure may be formed on the light guide plate by microstructure forming processes, such as injecting, hot pressing, ink-jetting and the like so as to enhance scattering of light on the light guide plate, and further to improve luminance uniformity in respective areas of the light guide plate.

However, with the development of the liquid crystal display toward narrow bezel and low power consumption (i.e., fewer amount of light sources), the distance between light sources and the active area of the display panel becomes smaller, and the pitch between adjacent light sources becomes larger, which results in smaller A/P ratio. When the A/P ratio is smaller than a certain value, dark areas are inevitably generated on the light guide plate to cause hotspot phenomenon, even if the dot-pattern micro-structure is provided on the light guide plate. By taking a display panel applicable to a notebook computer as an example, practice has proven that, when the A/P ratio is smaller than 0.65, the hotspot phenomenon will occur on the light guide plate, and cannot be alleviated by providing the dot-pattern micro-structure. In this case, in order to further alleviate the hotspot phenomenon, a shading tape is generally attached to U-bending portion of a back plate below the light guide plate, and a side of the shading tape facing the light guide plate is all white or black so that the shading tape may absorb light emitted from the light sources or reflect light emitted from the light sources to the light guide plate, to decrease or increase luminance of a corresponding area on the light guide plate.

However, in practical applications, the side of the above shading tape facing the light guide plate is generally a smooth plane, which results in that, when such shading tape is used to attenuate or enhance the luminance of a corresponding area on the light guide plate, the luminance of the area is attenuated or enhanced by the same magnitude, that is, the shading tape cannot enhance the luminance of an area with low luminance on the light guide plate and attenuate the luminance of an area with high luminance on the light guide plate in a targeted manner.

SUMMARY OF THE INVENTION

The present invention aims to solve at least one of the technical problems existing in the prior art, and provides a light compensator, a shading tape, a backlight module and a display device. The light compensator is provided with a recess which can perform light compensation on an area with low luminance on the light-exiting surface of an optical element, thus enhancing the luminance of the area(s), and further achieving luminance uniformity of respective areas on the light-exiting surface of the optical element.

To achieve the object of the present invention, there is provided a light compensator comprising a first surface on which at least one recess is provided, wherein, when the light compensator is arranged above an edge of an optical element, the first surface faces a light-exiting surface of the optical element, and a surface of the recess is capable of converging light irradiating thereon and reflecting the light toward an area with low luminance on the light-exiting surface of the optical element.

Preferably, the surface of the recess is a curved surface.

Preferably, the recess has the same curvature throughout its surface.

Preferably, when the light compensator is arranged above the edge of the optical element, a center of the recess corresponds to the area with low luminance on the light-exiting surface of the optical element.

Preferably, the light compensator is made of any one or a combination of two or more of polyethylene terephthalate, polypropylene resin, polycarbonate, polystyrene, polyethylene, polyvinyl chloride, acrylonitrile-butadiene-styrene copolymer, high impact polystyrene, biaxially oriented polystyrene and biaxially oriented polyester film.

Preferably, a reflective layer is attached to the first surface of the light compensator and the surface of the recess.

Preferably, the reflective layer is formed by aluminum foil or silver foil; or, the reflective layer is formed by polyethylene terephthalate film layer coated on the first surface and the surface of the recess.

Preferably, curvatures at positions on the surface of the recess are different.

Preferably, the first surface is parallel to the light-exiting surface of the optical element;

when the light compensator is arranged above the edge of the optical element, the curvature of the surface of the recess, a radian of the surface of the recess and a distance from an edge of the area with low luminance on the light-exiting surface of the optical element to an edge of the recess along a width direction of the area with low luminance satisfy the following relationships:

$$2a + L2 = 2R \times \sin\frac{\alpha}{2}$$

$$(a+L2)^2 + L^2 = \left(R + \frac{L2}{2\sin\frac{\alpha}{2}}\right)^2$$

$$\frac{L2}{2\tan\frac{\alpha}{2}} : L = \frac{L2}{2} : (a+L2)$$

wherein, L is a vertical distance between the first surface and the light-exiting surface of the optical element, L2 is a width of the area with low luminance, R is the curvature of the surface of the recess, a is the radian of the surface of the recess, and a is the distance from the edge of the area with low luminance on the light-exiting surface of the optical element to the edge of the recess along the width direction of the area with low luminance.

Preferably, the light compensator is wedge-shaped, and the first surface of the light compensator is a surface with the largest area on the wedge-shaped light compensator.

As another aspect of the present invention, the present invention provides a shading tape comprising a base, a bonding layer and a light compensator, wherein, the base is located between the bonding layer and the light compensator, the light compensator is the above light compensator provided by the present invention, and a surface of the light compensator opposite to the first surface is connected with the base.

As still another aspect of the present invention, the present invention provides a backlight module comprising an optical element, a back plate and a shading tape, wherein, the back plate comprises a base plate located below the optical element, a fixing plate located above a side of the optical element and a connecting plate connecting the fixing plate and the base plate; the shading tape is the above shading tape provided by the present invention, the bonding layer of the shading tape is bonded to the fixing plate, so that the first surface of the light compensator of the shading tape faces the light-exiting surface of the optical element.

Preferably, a side of the light compensator with a smaller thickness is away from a light-entering surface of the optical element, and a side of the light compensator with a larger thickness is close to the light-entering surface of the optical element.

As another aspect of the present invention, the present invention provides a display device comprising the above backlight module provided by the present invention.

The present invention has the following beneficial effects:

For the light compensator provided by the present invention, the first surface thereof faces the light-exiting surface of the optical element, and the recess on the first surface corresponds to the area with low luminance on the light-exiting surface of the optical element, so that when light exits from the light-exiting surface of the optical element, the surface of the recess can reflect the light reaching thereon to the area with low luminance on the light-exiting surface of the optical element, so as to enhance the luminance of the area with low luminance on the light-exiting surface of the optical element to perform light compensation thereon, and achieve luminance uniformity of the respective areas on the light-exiting surface of the optical element.

For the shading tape provided by the present invention, it comprises the above light compensator provided by the present invention, the shading tape overcomes disadvantages that the existing shading tape can only achieve a shading effect or can only reflect light at the same magnitude, and the shading tape provided by the present invention can enhance the luminance of the area with low luminance on the light-exiting surface of the optical element to perform light compensation thereon, and achieve luminance uniformity of the respective areas on the light-exiting surface of the optical element.

For the backlight module provided by the present invention, it comprises the above shading tape provided by the present invention, and thus can enhance the luminance of the area with low luminance on the light-exiting surface of the optical element to perform light compensation thereon, achieve luminance uniformity of the respective areas on the light-exiting surface of the optical element, and further improve uniformity of backlight.

For the display device provided by the present invention, it comprises the above light compensator, shading tape or backlight module provided by the present invention, and thus can enhance the luminance of the area with low luminance on the light-exiting surface of the optical element to perform light compensation thereon, achieve luminance uniformity of the respective areas on the light-exiting surface of the optical element, and further improve uniformity of backlight.

BRIEF DESCRIPTION OF THE DRAWINGS

The accompanying drawings, which constitute a part of the specification, is used for providing a further understanding of the present invention and used for explaining the present invention together with the following specific implementations, rather than limiting the present invention. In the accompanying drawings.

DETAILED DESCRIPTION OF THE EMBODIMENTS

Specific implementations of the present invention will be described in detail below in conjunction with the accompanying drawings. It should be understood that, the specific implementations described herein are merely used for illustrating and explaining the present invention, rather than limiting the present invention.

Figure 1:
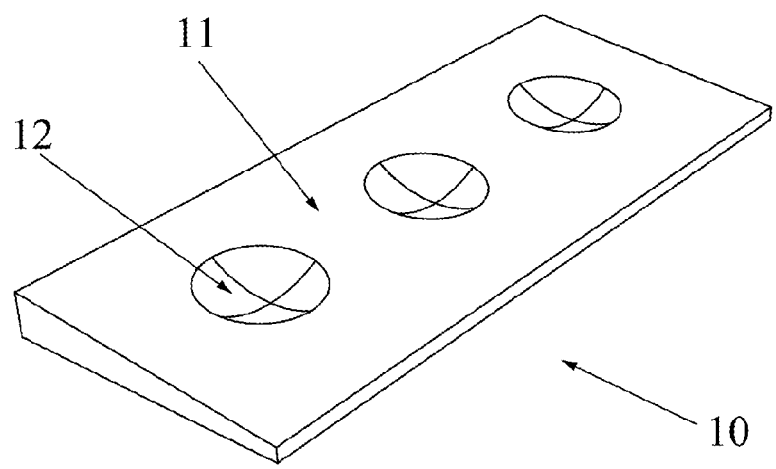
FIG. 1 is a schematic diagram of a structure of a light compensator provided by an embodiment of the present invention.
Figure 2:
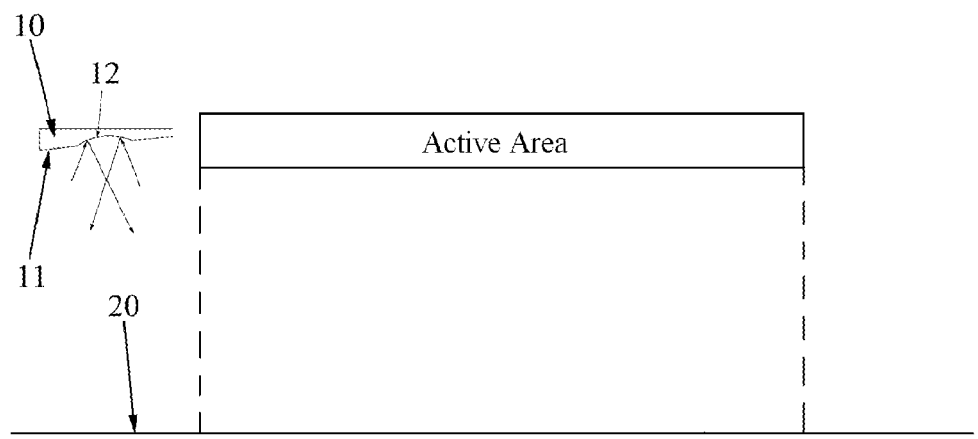
FIG. 2 is a schematic diagram of a backlight module to which the light compensator shown in FIG. 1 is applied.

FIG. 1 is a schematic diagram of a structure of a light compensator provided by an embodiment of the present invention. FIG. 2 is a schematic diagram of a backlight module in which the light compensator shown in FIG. 1 is applied. Referring to FIGS. 1 and 2, the light compensator 10 is used for performing light compensation on an area with low luminance on a light-exiting surface of an optical element 20. The optical element may be a light guide plate, a diffuser plate, a prism sheet or the like, which is not limited in the present invention. For ease of explanation, embodiments of the present invention are described by taking a case that the optical element is a light guide plate as an example. It can be understood that, the light compensator can not only be applied to a backlight module to perform light compensation on the optical element (e.g., light guide plate) in the backlight module so as to improve uniformity of backlight, but can be also used to perform light compensation on a light-entering end of some small-sized models so as to eliminate situations such as splay shadows at both sides of the light-entering end. Specifically, the light compensator 10 is located above the edge of the optical element 20, and comprises a first surface 11 which faces the light-exiting surface of the optical element 20 and on which at least one recess 12 is provided. When the light compensator 10 is provided above the optical element 20 and light exits from the light-exiting surface of the optical element 20, a surface of the recess 12 can reflect light reaching thereon toward an area with low luminance on the light-exiting surface of the optical element 20 to perform light compensation on the area and enhance the luminance of the area, so that luminance uniformity of the respective areas on the light-exiting surface of the optical element 20 is improved. Specifically, in the present embodiment, the optical element 20 is a light guide plate in a backlight module, a light-entering surface of the light guide plate faces light sources and the light-exiting surface thereof faces a display panel.

Preferably, the surface of the recess 12 is a curved surface; and the curved surface can achieve a function of enabling the light to be converged more uniformly and making the luminance of the optical element more uniform.

Specifically, in the present embodiment, there are a plurality of recesses 12, and when light exits from the light-exiting surface of the optical element 20, the recesses 12 are in one-to-one correspondence with the areas with low luminance on the light-exiting surface of the optical element 20.

Specifically, as shown in FIG. 2, the light compensator 10 is located outside an area on the light-exiting surface of the optical element 20 corresponding to the active area. In the present embodiment, the light compensator 10 is wedge-shaped; a first surface 11 thereof is a surface with the largest area on the wedge-shaped light compensator 10, a side thereof with a smaller thickness is away from the light-entering surface of the optical element 20, and a side thereof with a larger thickness is close to the light-entering surface of the optical element 20, which makes the first surface of the light compensator 10 face an area, which is located below the light compensator 10, on the light-exiting surface of the optical element 20, and the area on the light-exiting surface of the optical element 20 corresponding to the active area, so as to perform light compensation on areas with low luminance in said areas, improve the luminance of the areas with low luminance and luminance uniformity of the optical element 20, and further, enable more light to enter the optical element 20 to improve utilization of light.

Figure 3:
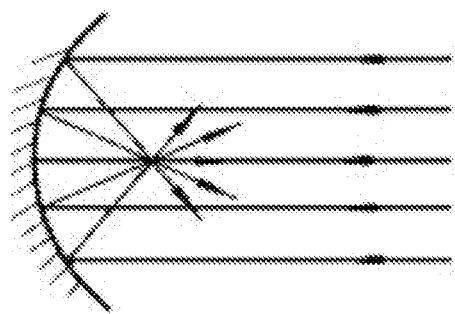
FIG. 3 is a schematic diagram illustrating that a recess on a first surface of the light compensator shown in FIG. 1 converges light.

FIG. 3 is a schematic diagram illustrating that the recess on the first surface of the light compensator shown in FIG. 1 converges light. As shown in FIG. 3, in the present embodiment, the recess 12 has the same curvature throughout its surface (i.e., the surface of the recess 12 is a spherical surface). It should be noted that, the recess 12 may have different curvatures at different positions of its surface, for example, the recess 12 may have a gradient curved surface or a prism structure, or the recess 12 may have the same surface as a Fresnel lens, etc., as long as the recess 12 can converge the reflected light to the area with low luminance on the light-exiting surface of the optical element 20. When the light sources emit light toward the optical element 20, the light enters the optical element 20 from the light-entering surface of the optical element 20 and exits from the light-exiting surface of the optical element 20 so that the optical element 20 serves as a surface light source. Light is emitted from a part of areas (including areas with high luminance and areas with low luminance) on the light-exiting surface of the optical element 20 corresponding to the light compensator 10 to the position of the light compensator 10. Here, the recess 12 forms a concave mirror, light irradiating onto the recess 12 is converged after reflected by the surface of the recess 12, and in the present embodiment, the converged light irradiates on the area with low luminance on the light-exiting surface of the optical element 20, which can increase the luminance of the area with low luminance on the light-exiting surface of the optical element 20 so that luminance uniformity of respective areas on the light-exiting surface of the optical element 20 can be achieved.

In the present embodiment, an angle at which the first surface 11 faces the light-exiting surface of the optical element 20, an interval between adjacent recesses 12 and the surface curvature of each recess 12 may be set so that the plurality of recesses 12 on the first surface 11 respectively correspond to areas with low luminance on the light-exiting surface of the optical element 20 when light exits from the light-exiting surface of the optical element 20, and in this way, the plurality of recesses 12 may perform light compensation on the areas with low luminance on the light-exiting surface of the optical element 20, respectively.

The principle and process that parameters such as the surface curvature of each recess 12 and the like are set so that recesses 12 may perform light compensation on areas with low luminance on the light-exiting surface of the optical element 20 will be described below. Specifically, to simplify the explanation, a process of performing, by the recesses 12, light compensation on areas with low luminance outside an area on the light-exiting surface of the optical element 20 corresponding to the active area when each recess 12 has the same curvature throughout its surface, the first surface 11 is parallel to the light-exiting surface of the optical element 20, and centers of the recesses 12 are respectively arranged right above the areas with low luminance which need light compensation, is taken as an example.

Figure 4:
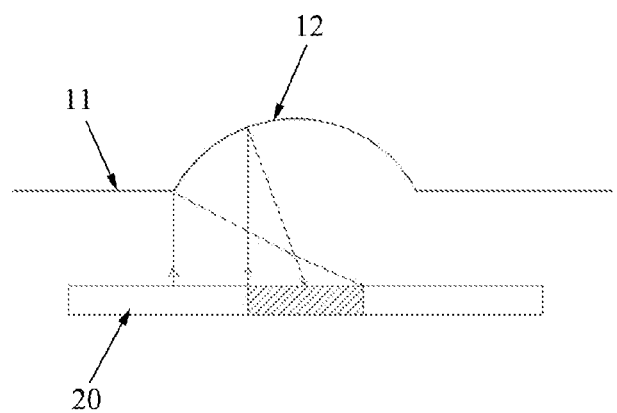
FIG. 4 is a schematic diagram illustrating a principle of performing, by a recess, light compensation on an area with low luminance on the light guide plate.

Firstly, as shown in FIG. 4, since the light which exits from an area, right below a recess 12, on the light-exiting surface of the optical element 20 and then vertically irradiates on the surface of the recess 12 is direct light which has the highest and most adequate luminance, the light vertically irradiating on the recess 12 is taken as an object of study in the present embodiment. Further, as shown in FIGS. 5 and 6, before the principle and process that a recess 12 performs light compensation on an area with low luminance on the light-exiting surface of the optical element 20 is explained, the following parameters are defined: a vertical distance between the first surface 11 and the light-exiting surface of the optical element 20 is L, a width of an area with low luminance which needs to be compensated is L2, a curvature of the surface of a recess 12 is R, a radian of the surface of the recess 12 is a, and a distance from the edge of the area with low luminance to the edge of the recess along the width direction of the area with low luminance is a.

Figure 5:
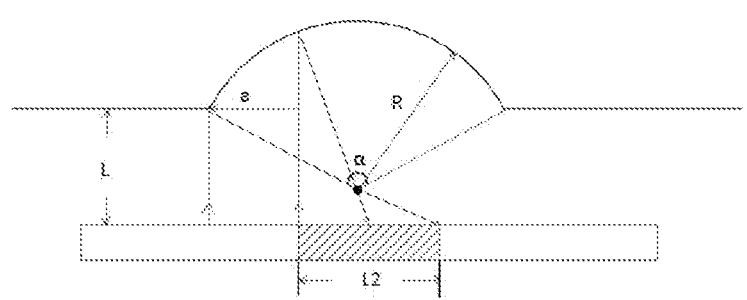
FIG. 5 is another schematic diagram illustrating a principle of performing, by a recess, light compensation on an area with low luminance on the light guide plate.
Figure 6:
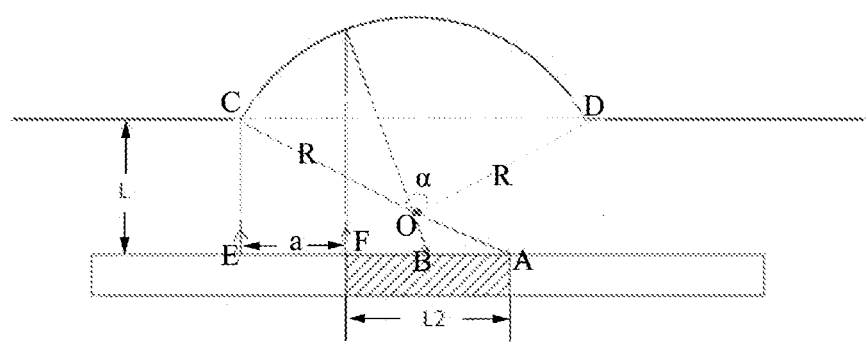
FIG. 6 is still another schematic diagram illustrating a principle of performing, by a recess, light compensation on an area with low luminance on the light guide plate.

Specifically, as shown in FIGS. 5 and 6, at one side of the area with low luminance (dashed area in FIGS. 5 and 6), light vertically irradiating onto a joint (point C in FIG. 6) between the recess 12 and the first surface 11 is reflected to the edge (point A in FIG. 6) of the other side of the area with low luminance, light exiting from the edge (point F in FIG. 6) of the area with low luminance and then vertically irradiating on the recess 12 is reflected to a position (point B in FIG. 6) close to the center of the area with low luminance, and in this embodiment, the position (point B) is approximately regarded as the center of the area with low luminance. Base on the above, on the left side of the area with low luminance in FIG. 6, the light vertically irradiating on the recess 12 performs light compensation on the right half of the area with low luminance; and on the right side of the area with low luminance in FIG. 6, the light vertically irradiating on the recess 12 performs light compensation on the left half of the area with low luminance.

Referring to FIG. 6, a distance between point C and point D is L2+2a, meanwhile, the distance may also be expressed as 2R×sin α/2, and thus, the following equation ① can be obtained:

$$2a + L2 = 2R \times \sin\frac{\alpha}{2} \qquad ①$$

Further, in FIG. 6, point A, point C and point E form a right triangle, a line connecting between point A and point C passes through a center (point O in FIG. 6) of the spherical surface of the recess 12, a distance between point A and point O is X, then the following equation ② may be obtained according to the Pythagorean theorem:

$$(a+L2)^2 + L^2 = (R+X)^2 \qquad ②$$

In the meanwhile, from the above, a distance between point A and point B is approximately L2/2, and thus, ΔABO may be approximated as a right triangle, and the following equation ③ may be obtained:

$$\sin\frac{\alpha}{2} = \frac{L2}{2X} \qquad ③$$

By combining equations ② and ③ and eliminating X, the following equation ④ may be obtained:

$$(a + L2)^2 + L^2 = \left(R + \frac{L2}{2\sin\frac{\alpha}{2}}\right)^2 \qquad ④$$

Further, in FIG. 6, since ΔABO is approximated as a right triangle, it can be known that ΔABO~ΔAEC, and therefore, the following equation may be obtained:

BO/EC=AB/AE, that is $$\frac{L2}{2\tan\frac{\alpha}{2}} : L = \frac{L2}{2} : (a + L2) \qquad ⑤$$

In practical applications, when a display device to which the optical element 20 is applied is determined, values of L and L2 are determined, and in this case, by combining equations ①, ④ and ⑤:

$$2a + L2 = 2R \times \sin\frac{\alpha}{2} \qquad ①$$

$$(a + L2)^2 + L^2 = \left(R + \frac{L2}{2\sin\frac{\alpha}{2}}\right)^2 \qquad ④$$

$$\frac{L2}{2\tan\frac{\alpha}{2}} : L = \frac{L2}{2} : (a + L2) \qquad ⑤$$

values of R, a and α can be calculated when the values of L and L2 are known.

By taking a certain display device (models 12.5~201 of DELL) to which the above optical element 20 is applied as an example, L=1.03 mm, L2=6.65 mm, and by substituting values of L and L2 into the above equations ①, ④ and ⑤, it can be obtained through calculation that:

R=3.2 mm; a=1.0 mm; α=158°.

In practical applications, considering machining precision of the surface of the recess 12 and assembly error, R may be set to be in the range of 3.0~3.5 mm, a may be set to be in the range of 0.95~1.15 mm, and a may be set to be in the range of 140°~165°.

With the above settings, the recess 12 may perform light compensation on the area with low luminance outside an area on the light-exiting surface of the optical element 20 corresponding to the active area, so as to improve backlight uniformity of the above display device 20 to which the optical element 20 is applied, and avoid visible dark areas in the case that the screen of the display device tilts.

The principle and process that the recess 12 performs light compensation on the area with low luminance outside an area corresponding to the active area on the light-exiting surface of the optical element 20 has been described by taking the case that the recess 12 has the same curvature throughout its surface, the first surface 11 is parallel to the light-exiting surface of the optical element 20, and the recess 12 is located right above the area with low luminance as an example, but in practical applications, the first surface 11 generally has a certain angle with respect to the light-exiting surface of the optical element 20 and thus faces the area on the light-exiting surface of the optical element 20 corresponding to the active area. In this case, the above parameters may be set in a similar way as above or by adopting the above equations, which is not elaborated herein. Further, curvatures at respective positions of the surface of the recess 12 may not be completely the same, as long as a part of light from the light-exiting surface of the optical element 20 can be converged and reflected to the area with low luminance on the light-exiting surface of the optical element 20. In this case, compared with the above process, the setting process of parameters of the recess 12 becomes more complex, but has a similar principle, and thus is not elaborated herein.

In the light compensator 10 provided by the present embodiment, the first surface 11 thereof faces the light-exiting surface of the optical element 20, and when light exits from the light-exiting surface of the optical element 20, the recesses 12 on the first surface 11 can converge all or a part of the light irradiating thereon and reflect the same to areas with low luminance on the light-exiting surface of the optical element 20, so as to enhance the luminance of the areas with low luminance on the light-exiting surface of the optical element 20 to perform light compensation thereon, achieve luminance uniformity of the respective areas on the light-exiting surface of the optical element 20, and further improve uniformity of backlight.

In the present embodiment, the light compensator 10 is made of any one or a combination of two or more of polyethylene terephthalate (PET), polypropylene resin (PP), polycarbonate (PC), polystyrene (PS), polyethylene (PE), polyvinyl chloride (PVC), acrylonitrile-butadiene-styrene copolymer (ABS), high impact polystyrene (HIPS), biaxially oriented polystyrene (BOPS) and biaxially oriented polyester film (BOPET). The recesses 12 on the first surface 11 of the light compensator 10 may be formed through a micro-structure processing technique such as hit-point technique, rolling technique, etching technique or the like.

In the present embodiment, a reflective layer which has a high reflectivity is attached to the first surface 11 of the light compensator 10 and the surfaces of the recesses 12, and can reflect more light to the areas with low luminance on the light-exiting surface of the optical element 20. Specifically, the reflective layer is formed by aluminum foil or silver foil; alternatively, the reflective layer is formed by polyethylene terephthalate (PET) film layer coated on the first surface 11 and the surfaces of the recesses 12.

Figure 7:
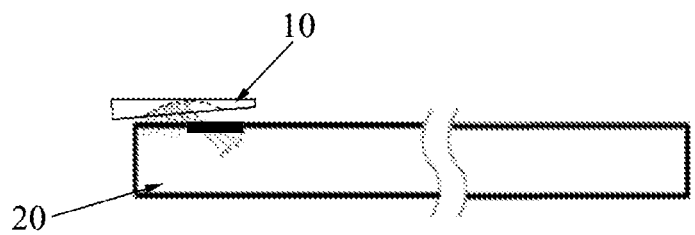
FIG. 7 is a schematic diagram illustrating a case that curvatures at respective positions on a surface of the recess are different.

It should be noted that, in the present embodiment, the recess 12 has the same curvature throughout its surface, but the present invention is not limited thereto. In practical applications, as shown in FIG. 7, the positions on the surface of the recess 12 may be set to have different curvatures, respectively, according to requirements of light compensation for the areas with low luminance on the light-exiting surface of the optical element 20, and in this way, the areas with low luminance on the light-exiting surface of the optical element 20 can be compensated in a more targeted manner, that is, according to different luminance of areas on the light-exiting surface of the optical element 20 that need to be compensated, light compensation with different intensities may be performed on these areas, which facilitates improving luminance uniformity of areas on the light-exiting surface of the optical element 20.

It should be further noted that, in the present embodiment, there are a plurality of recesses 12, and the plurality of recesses 12 are in one-to-one correspondence with the areas with low luminance on the light-exiting surface of the optical element 20, but the present invention is not limited thereto. In practical applications, the number of recesses 12 may be more than that of the areas with low luminance on the light-exiting surface of the optical element 20, that is, when light exits from the light-exiting surface of the optical element 20, multiple recesses 12 reflect the light irradiating thereon to one area with low luminance on the light-exiting surface of the optical element 20; alternatively, the number of recesses 12 may also be smaller than that of the areas with low luminance on the light-exiting surface of the optical element 20, that is, when light exits from the light-exiting surface of the optical element 20, there is a recess 12 which reflects the light irradiating thereon to multiple areas with low luminance on the light-exiting surface of the optical element 20, and it can be understood that, in this case, curvatures at positions on the surface of the recess 12 are different.

Figure 8:
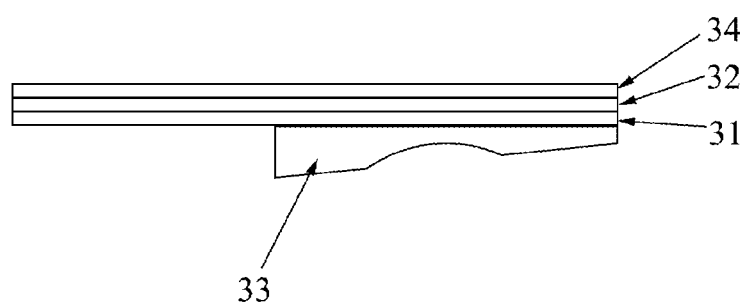
FIG. 8 is a schematic diagram of a structure of a shading tape provided by an embodiment of the present invention.

As another aspect of the present invention, an embodiment of the present invention provides a shading tape. FIG. 8 is a schematic diagram of a structure of a shading tape provided by the embodiment of the present invention. As shown in FIG. 8, the shading tape 30 comprises a base 31, a bonding layer 32 and a light compensator 33, and the base 31 is located between the bonding layer 32 and the light compensator 33, wherein, the light compensator 33 adopts the light compensator provided by the above embodiment of the present invention. Specifically, a surface of the light compensator 33 opposite to the first surface is connected with the base 31, and alternatively, the light compensator 33 may be fixed to the base 31.

Specifically, in the present embodiment, the base 31 is made of any one or a combination of two or more of polyethylene terephthalate (PET), polypropylene resin (PP), polycarbonate (PC), polystyrene (PS), polyethylene (PE), polyvinyl chloride (PVC), acrylonitrile-butadiene-styrene copolymer (ABS), high impact polystyrene (HIPS), biaxially oriented polystyrene (BOPS) and biaxially oriented polyester film (BOPET). The bonding layer 32 is made of acrylate adhesive.

In addition, the shading tape 30 may further comprise a release layer 34 which is provided at a side of the bonding layer 32 opposite to the side at which the base 31 is located, and is used for protecting the bonding layer 32. In use, the release layer 34 is removed, and the bonding layer 32 is bonded and fixed to a holder so as to fix the shading tape 30 and the light compensator 33.

The shading tape 30 provided by the present embodiment comprises the light compensator 33 provided by the above embodiment of the present invention, and thus can perform light compensation on areas with low luminance on the light-exiting surface of the optical element, increase the luminance of the areas, and achieve luminance uniformity of respective areas on the light-exiting surface of the optical element. Compared to the prior art, the shading tape provided by the present embodiment does not just absorb light, nor just reflect light at the same magnitude, but also increase the luminance of required areas (e.g., dark areas on the light guide plate) in a targeted manner, thus overcoming the defect of the conventional shading tape.

Figure 9:
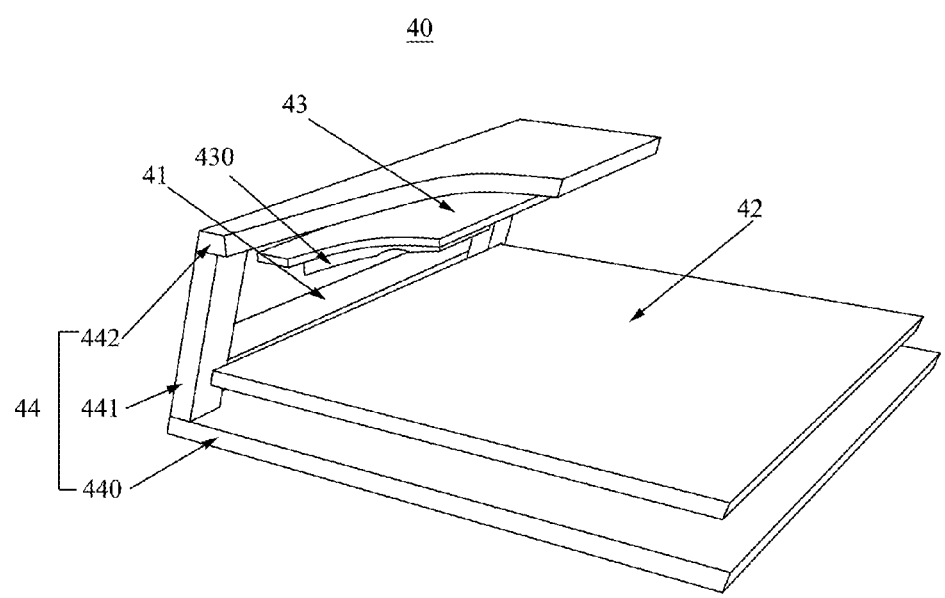
FIG. 9 is a schematic diagram of a structure of a backlight module provided by an embodiment of the present invention.

As another aspect of the present invention, an embodiment of the present invention provides a backlight module. FIG. 9 is a schematic diagram of a structure of the backlight module provided by the embodiment of the present invention. As shown in FIG. 9, the backlight module 40 comprises a light source 41, an optical element 42, an optical film layer (not shown in the figure) and a shading tape 43, wherein, the light source 41 is a light bar consisting of a plurality of LED lamps; the optical element 42 is a light guide plate; the shading tape 43 adopts the shading tape provided by the above embodiment of the present invention, and a light compensator 430 of the shading tape 43 is configured to reflect some light irradiating thereon from a part of areas on the light-exiting surface of the optical element 42 toward areas with low luminance on the light-exiting surface of the optical element 42, so as to compensate for the areas with low luminance on the light-exiting surface of the optical element 42.

Specifically, as shown in FIG. 9, the backlight module 40 comprises a back plate 44 which comprises a base plate 440 located below the optical element 42, a fixing plate 442 located above a side of the optical element 42 and a connecting plate 441 connecting the fixing plate 442 and the base plate 440. A bonding layer of the shading tape 43 is bonded to the fixing plate 442 such that the first surface of the light compensator 430 faces the light-exiting surface of the optical element 42.

Specifically, in the present embodiment, the light compensator 430 is wedge-shaped, a side of the light compensator 430 with a smaller thickness is away from a light-entering surface of the optical element 42, and a side thereof with a larger thickness is close to the light-entering surface of the optical element 42, which makes the first surface of the light compensator 430 face the light-exiting surface of the optical element 42. Moreover, by setting an angle at which the first surface faces the light-exiting surface of the optical element 42, the number and positions of the recesses and the surface curvature of each recess, the recesses on the first surface respectively correspond to areas with low luminance on the light-exiting surface of the optical element 42 when the backlight module 40 emits light, and meanwhile, an angle existing between the first surface and the light-exiting surface of the optical element 42 may ensure that more light can enter into the light-emitting area of the optical element 42.

The backlight module 40 provided by the present embodiment comprises the shading tape 30 provided by the above embodiment of the present invention, and thus can perform light compensation on areas with low luminance on the optical element 42, increase the luminance of the areas, achieve luminance uniformity of respective areas on light guide plate 42, and further improve uniformity of backlight.

As another aspect of the present invention, the present invention further provides a display device comprising the backlight module provided by the above embodiment of the present invention, so as to provide uniform backlight to a display panel.

The display device provided by the present embodiment comprises the light compensator, the shading tape or the backlight module provided by the above embodiments of the present invention, and thus can achieve luminance uniformity of areas on the light-exiting surface of the optical element, and further improve uniformity of backlight.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

What is claimed is:

1. A light compensator, comprising a first surface on which at least one recess is provided, wherein, when the light compensator is arranged above an edge of an optical element, the first surface faces a light-exiting surface of the optical element, and a surface of the recess is capable of converging light irradiating thereon and reflecting the light toward an area with low luminance on the light-exiting surface of the optical element.

2. The light compensator according to claim 1, wherein, the surface of the recess is a curved surface.

3. The light compensator according to claim 2, wherein, the recess has the same curvature throughout its surface.

4. The light compensator according to claim 3, wherein, when the light compensator is arranged above the edge of the optical element, the center of the recess corresponds to the area with low luminance on the light-exiting surface of the optical element.

5. The light compensator according to claim 4, wherein, the first surface is parallel to the light-exiting surface of the optical element;
when the light compensator is arranged above the edge of the optical element, the curvature of the surface of the recess, a radian of the surface of the recess and a distance from an edge of the area with low luminance on the light-exiting surface of the optical element to an edge of the recess along a width direction of the area with low luminance satisfy the following relationships:

$$2a + L2 = 2R \times \sin\frac{\alpha}{2}$$

$$(a + L2)^2 + L^2 = \left(R + \frac{L2}{2\sin\frac{\alpha}{2}}\right)^2$$

$$\frac{L2}{2\tan\frac{\alpha}{2}} : L = \frac{L2}{2} : (a + L2)$$

wherein, L is a vertical distance between the first surface and the light-exiting surface of the optical element, L2 is a width of the area with low luminance, R is the curvature of the surface of the recess, $\alpha$ is the radian of the surface of the recess, and a is the distance from the edge of the area with low luminance on the light-exiting surface of the optical element to the edge of the recess along the width direction of the area with low luminance.

6. The light compensator according to claim 3, wherein, a reflective layer is attached to the first surface of the light compensator and the surface of the recess.

7. The light compensator according to claim 2, wherein, curvatures at positions on the surface of the recess are different.

8. The light compensator according to claim 1, wherein, when the light compensator is arranged above the edge of the optical element, a center of the recess corresponds to the area with low luminance on the light-exiting surface of the optical element.

9. The light compensator according to claim 1, wherein, the light compensator is made of any one or a combination of two or more of polyethylene terephthalate, polypropylene resin, polycarbonate, polystyrene, polyethylene, polyvinyl chloride, acrylonitrile-butadiene-styrene copolymer, high impact polystyrene, biaxially oriented polystyrene and biaxially oriented polyester film.

10. The light compensator according to claim 1, wherein, a reflective layer is attached to the first surface of the light compensator and the surface of the recess.

11. The light compensator according to claim 10, wherein, the reflective layer is formed by aluminum foil or silver foil; or, the reflective layer is formed by polyethylene terephthalate film layer coated on the first surface and the surface of the recess.

12. The light compensator according to claim 1, wherein, the light compensator is wedge-shaped, and the first surface of the light compensator is a surface with the largest area on the wedge-shaped light compensator.

13. A shading tape, comprising a base, a bonding layer and a light compensator, wherein, the base is located between the bonding layer and the light compensator, the light compensator is the light compensator according to claim 1, and a surface of the light compensator opposite to the first surface is connected with the base.

14. The shading tape according to claim 13, wherein, the surface of the recess is a curved surface.

15. The shading tape according to claim 13, wherein, the light compensator is wedge-shaped, and the first surface of the light compensator is a surface with the largest area on the wedge-shaped light compensator.

16. The shading tape according to claim 13, wherein, a reflective layer is attached to the first surface of the light compensator and the surface of the recess.

17. The shading tape according to claim 13, wherein, the light compensator is made of any one or a combination of two or more of polyethylene terephthalate, polypropylene resin, polycarbonate, polystyrene, polyethylene, polyvinyl chloride, acrylonitrile-butadiene-styrene copolymer, high impact polystyrene, biaxially oriented polystyrene and biaxially oriented polyester film.

18. A backlight module, comprising an optical element, a back plate and a shading tape, wherein, the back plate comprises a base plate located below the optical element, a fixing plate located above a side of the optical element and a connecting plate connecting the fixing plate and the base plate; the shading tape is the shading tape according to claim 13, the bonding layer of the shading tape is bonded to the fixing plate, so that the first surface of the light compensator of the shading tape faces the light-exiting surface of the optical element.

19. The backlight module according to claim 18, wherein, the light compensator is wedge-shaped, and the first surface of the light compensator is a surface with the largest area on the wedge-shaped light compensator.

20. The backlight module according to claim 18, wherein, a side of the light compensator with a smaller thickness is away from a light-entering surface of the optical element, and a side of the light compensator with a larger thickness is close to the light-entering surface of the optical element.

* * * * *